United States Patent [19]

Rambo

[11] Patent Number: 4,499,606
[45] Date of Patent: Feb. 12, 1985

[54] RECEPTION ENHANCEMENT IN MOBILE FM BROADCAST RECEIVERS AND THE LIKE

[75] Inventor: William R. Rambo, Stanford, Calif.

[73] Assignee: SRI International, Menlo Park, Calif.

[21] Appl. No.: 453,470

[22] Filed: Dec. 27, 1982

[51] Int. Cl.³ .......................... H04B 7/08; H04B 1/10
[52] U.S. Cl. .................................. 455/277; 455/278; 455/297
[58] Field of Search ............... 455/52, 65, 133–135, 455/140, 206, 277, 278, 297, 303; 375/100

[56] References Cited

U.S. PATENT DOCUMENTS

| | | |
|---|---|---|
| 2,243,118 | 5/1941 | Peterson ........................ 455/277 |
| 2,520,984 | 9/1950 | Williams . |
| 2,729,741 | 1/1956 | Chapman . |
| 2,872,568 | 2/1959 | Provaz ........................... 455/277 |
| 2,904,677 | 9/1959 | Heidester ....................... 455/277 |
| 2,937,268 | 5/1960 | Downie . |
| 3,182,263 | 5/1965 | Gossard ......................... 455/277 |
| 3,329,901 | 7/1967 | Case . |
| 3,368,151 | 2/1968 | Verwey et al. . |
| 3,475,686 | 10/1969 | Holt . |
| 3,537,011 | 10/1970 | Escoula . |
| 3,670,275 | 6/1972 | Kalliomaki et al. . |
| 4,091,386 | 5/1978 | Luedtke et al. ................ 343/713 |
| 4,143,369 | 3/1979 | Ayers et al. .................... 343/6.5 R |
| 4,170,759 | 10/1979 | Stimple et al. . |
| 4,255,816 | 3/1981 | Grunza et al. ................. 455/277 |

FOREIGN PATENT DOCUMENTS

| | | |
|---|---|---|
| 2827572 | 12/1979 | Fed. Rep. of Germany ...... 455/277 |
| 0168440 | 12/1981 | Japan . |
| 0156031 | 12/1981 | Japan ................. 455/277 |
| 0014224 | 1/1982 | Japan . |
| 0010542 | 1/1982 | Japan ................. 455/277 |

OTHER PUBLICATIONS

Experimental Switched-Diversity System for VHF AM Mobile Radio—Parsons Proc. IEE, vol. 122, No. 8, pp. 780–784, Aug. 1975.
FM Multipath Distortion in Automobile Receivers Has Been Significantly Reduced By a New Antenna System—Takeda et al., IEEE Trans on Consumer Electronics, vol. CE-26, Aug. 1980, pp. 263–269.

Primary Examiner—Marc E. Bookbinder
Attorney, Agent, or Firm—Victor R. Beckman

[57] ABSTRACT

A system for enhancing the quality of a signal received by a mobile FM transmitter by reducing the adverse effects of multipath transmission to the receiver. A pair of antennas is provided, and each antenna is arranged to receive transmitted signals that traverses a different path. The signal produced in the receiver by one antenna is compared with a reference threshold and when the amplitude of the signal falls below the reference threshold, the receiver switches to the other antenna. The signal amplitude is sensed in a high frequency portion of the receiver, i.e. before detection or demodulation, so that switching between antennas occurs rapidly and is normally not perceived by the user of the receiver. Sensitivity to switching is dependent on the rate of change of the received signal amplitude and on the modulation frequency of the received signal so that the system responds both to an overall reduction in received signal strength and to reduction in the strength of the high frequency portions of the received signal.

28 Claims, 8 Drawing Figures

RECEPTION ENHANCEMENT IN MOBILE FM BROADCAST RECEIVERS AND THE LIKE

BACKGROUND OF THE INVENTION

1. Field of the Invention

This invention relates to a method and an apparatus for enhancing reception in a mobile broadcast band FM receiver and more particularly to method and apparatus which affords continuous selection among two or more received samples of a transmitted signal.

2. Description of the Prior Art

FM broadcast utilizes transmissions in the VHF range which typically traverse a line of sight path. Receivers disposed in fringe areas or other locations without a line of sight path to the transmitter often receive plural signals which arrive at the receiver via different paths due to diffraction, refraction and/or reflection. The condition is known as multipath reception. Where plural signals arriving at the receiver are out of phase, the signals can partially or completely cancel one another and significantly degrade reception quality. A known expedient for reducing the adverse effects of signal cancellation due to out of phase arrival of the transmitted signals is to provide two antennas at spaced apart locations and/or of different polarizations and to connect the antenna having the strongest signal to the receiver. This is called diversity reception; the benefit accrues because the momentary multipath disturbances may not occur simultaneously at the two antennas.

Exemplifying such known expedient is the system disclosed in U.S. Pat. No. 2,729,741 in which one of two antennas is connected via a relay switch to a receiver. The relay switch is controlled by a circuit which measures the detected or demodulated receiver output arising from each of the two antenna signals and operates the switch so as to connect the antenna with the stronger signal to the receiver. The system continuously tests the signals received by two antennas and switches the receiver to the antenna receiving the stronger signal even though the signal received by the other antenna is of adequate strength. Such switching takes place at a relatively slow rate, a rate within the audible range, and therefore, is discernible by and bothersome to the listener, particularly when the program material is wide band stereophonic sound as typically broadcast in the FM band.

U.S. Pat. No. 2,872,568 discloses a similar system in which one of two antennas is connected to a receiver by means of a twin triode switch. As in the case of the system disclosed in the U.S. Pat. No. 2,729,741, the circuitry of patent 2,872,568 responds to the detected or demodulated signal as a result of which the switching of the antennas is audible to the listener of the receiver with which the patented system is employed. Moreover, the listener frequently hears a signal fade before the patented system switches to the other antenna.

In an article titled "FM Multipath Distortion in Automobile Receivers Has Been Significantly Reduced by a New Antenna System" by Takeda et al, IEEE Transactions on Consumer Electronics, vol. CE-26, Aug. 1980, there is described a system employing two orthogonally disposed loop antennas and a switching circuit which couples the antenna having the better received signal to a mobile FM receiver. The sensing circuit disclosed in the article responds to the strength of the signal only after it has been demodulated or detected in consequence of which system operation is substantially influenced by the nature of the program material and the selective fading of the material.

The previously described prior art references as well as the present invention can be better understood by considering the phenomena that adversely affect the quality of the received signal in a mobile FM broadcast band receiver; such phenomena will be briefly described.

"Fast fading" occurs within a fraction of a wavelength due to signal reflections from obstacles near the vehicle in which the receiver is mounted. A vehicle moving through regions where such reflections are present experiences fades at a rate dependent upon vehicle speed.

"Slow fading" occurs over tens of wavelengths and is associated with terrain profile and the general nature of the environment, which influence the relative phase difference of the signals arriving at the receiver antennas.

"Selective fading" refers to fading that varies in degree with the frequency of the signal modulated onto the carrier. Selective fading is important in FM broadcast reception because in the case of stereophonic material the modulation has a wide band width, typically 150 KHz. In some areas, lower modulation frequencies are typically received without difficulty, but selective fading can occur with full program modulation, i.e. modulation containing relatively high frequency signals. Selective fading can occur whether or not the vehicle carrying the receiver is moving and can adversely affect reception within microseconds.

All of the foregoing fading phenomena arise at least in part from multipath signals arriving at an antenna. Consequently, the adverse effects arising from the phenomena can be ameliorated by diversity reception employing two antennas that are physically spaced apart from one another or that are polarized differently from one another so that disturbing fades are not simultaneous.

The program material, the information, appears in the transmission as a frequency modulation; signal amplitude is nominally constant in the short term. The multipath disturbances appear typically as superimposed amplitude fluctuations with characteristics in accord with fade type. While an FM receiver is designed to discriminate against momentary noise impulses (as from lightning), the multipath phenomena may modify the character of the FM transmission to create severe disturbances in the forms of noise and distortion in the program material.

The success of diversity reception as an ameliorating factor depends on obtaining signal samples from antennas independently affected by multipath, then providing circuitry for deciding which antenna should be connected at any moment and switching to that antenna such that switching transients do not, themselves, impair the quality of reception. This invention is directed to such circuitry.

SUMMARY OF THE INVENTION

Circuitry embodying the present invention responds to signal condition at a point in the receiver before normal FM detection or demodulation of the received signal, for example, in the IF amplifier. At this point, the program material is in an FM format while the multipath phenomena can be sensed as amplitude fluctuations. Because the intermediate frequency amplifier in a typical FM broadcast receiver is broad band (in order to accommodate the transmitted signal), fast amplitude fluctuations can be detected, often with sufficient rapidity that antenna switching can be effected before the listener perceives any degradation in the received signal. Thus in many cases the receiver is switched from one antenna to another antenna without discernible effect on the quality of the received program material.

Thus, an advantage of testing the received signal before it is demodulated is that the onset of a disturbance can be responded to before the demodulated signal is noticeably affected.

A decision to switch results from sensing signal conditions in the IF amplifier and the circuitry takes into account the nature of the fading phenomena, e.g. fade rate ("fast fade"), disturbance level ("selective fading"), etc. Switching occurs when the sensed impact of the multipath phenomena exceeds a threshold level. Circuitry automatically adjusts the threshold level in accordance with the aggregate signal level of the transmission. This enables the system to respond to the very great differences (factors of thousands) in aggregate signal level such as occur in an FM receiver when it is tuned from station to station, or to the signal changes encountered in a given transmission, as the distance to the station changes.

Although the aggregate signal level delivered by one antenna can be stronger than that from the alternate antenna, it is not necessarily the better signal in terms of noise and distortion. If a multipath fluctuation temporarily drives the received signal into an unacceptable condition, a circuit incorporating the invention causes the receiver to be switched to a different antenna. If the signal produced by the different antenna is of suitable condition, the receiver remains connected to it. But if it, too, is disturbed, the circuit measures the disturbance level, switches back to the original antenna for a comparative measurement and then dwells on the better signal. This "sampling" process is automatically initiated in such condition (both antenna signals disturbed) and occurs with sufficient rapidity (tens of microseconds) to minimize the net disturbance in the program output.

Circuits embodying the invention are arranged to respond differently to rapidly changing signals than to gradually changing signals. Accordingly, a relatively slow fade in which the signal never falls below an acceptable level does not cause antenna switching because a slow fade does not necessarily impair the listener's reception of the program material. In contrast, a relatively rapid fade frequently precedes a deep fade which would impair the quality of the received program material; a fast fade is detected and causes the receiver to be switched from one antenna to another antenna.

A circuit embodying the present invention is sensitive to frequency selective fading which can impair the quality of stereophonic program material, because such material is usually broad band material having high frequency components. Even through the portion of the signal at or near the carrier frequency is of adequate strength, a circuit in accordance with the invention effects antenna switching when the high frequency components of the signal fade below an acceptable level.

The command to switch antennas is delivered as an electrical signal to electronic r-f switching circuitry interposed between the two antennas and the normal antenna input connector of the receiver. Thus the switch operates broadband over the frequency range of the broadcast transmissions (i.e. 88–100 MHz), and affords very rapid switching which, with the balanced nature of the switch, minimizes adverse impact of switching transients.

The foregoing, together with other objects, features, and advantages of the invention, will be more apparent after referring to the following specification and the accompanying drawings.

DESCRIPTION OF A PREFERRED EMBODIMENT

Figure 1:
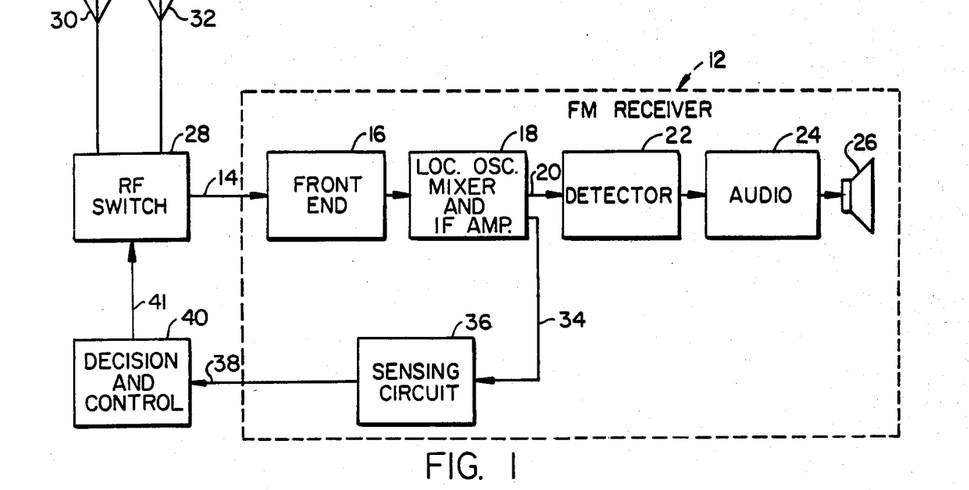
FIG. 1 is a block diagram of an FM receiver incorporating the invention.

Referring more particularly to the drawings, reference numeral 12 indicates a conventional FM receiver. Receiver 12 has an RF input path 14 which couples a signal to front end circuitry 16. Front end circuitry 16 has RF tuning capabilities and, typically, RF amplification capabilities. The output of front end circuitry 16 is applied to a mixer where it is combined with the signal from the local oscillator with the output delivered to IF amplification circuitry 18. In typical currently available FM receivers the local oscillator operates at a frequency such that, when mixed with the carrier frequency of the signal received from the front end circuitry, there is produced a signal at an intermediate frequency (IF) of 10.7 MHz which is amplified by the IF amplifier. Thus, at output 20 of the IF amplification circuitry there appears a strong signal centered at 10.7 MHz. This signal is applied to a detector 22 which demodulates the frequency modulated program material from the signal after which the program material is amplified by an audio amplifier 24 so as to drive one or more loudspeakers, one of which is indicated at 26.

The RF signal applied to input terminal 14 is constituted by the output of an RF switch 28 provided in accordance with the invention. As will appear in more detail hereinafter, RF switch 28 is a single-pole, double-throw electronic switch which is extremely fast. There are two inputs to RF switch 28: to one an antenna 30 is connected and to the other an antenna 32 is connected. One of the antennas can be a conventional whip antenna mounted on a fender, cowl, trunk deck or roof of an automobile. The other antenna is arranged to receive a signal different from that received by the first antenna; this is achieved by physically spacing the latter antenna from the former and/or by establishing the latter antenna at an orientation (polarization) different from the former antenna. For example, the second antenna can be embedded in the windshield of the vehicle. An equivalent of two physically separate antennas is a single array having two terminals or two switch selectable configurations to provide two received transmissions in which different multipath perturbations can occur.

RF switch 28 is controlled in accordance with the characteristics of the signals received by the antenna then connected. For controlling switch 28 the signal appearing at terminal 20, before FM demodulation by detector 22, is coupled on a circuit path 34 to a sensing circuit 36. The sensing circuit produces an output on a circuit path 38 which is indicative of the condition of the signal received via the antenna that is connected by the RF switch 28 to RF input terminal 14. If this signal is deemed unsatisfactory (level too low, selective fading, too noisy), as described in more detail hereinafter, a decision and control circuit 40 responds by applying a switching pulse on a path 41 to RF switch 28 so as to connect the other antenna to input terminal 14.

Sensing circuit 36 operates within the receiver to produce an output signal reflecting changes in the amplitude of the received signal, including those changes produced by the several multipath fading phenomena. Such circuit is included in modern receivers for other purposes, e.g. to operate a tuning meter providing an indication of proper receiver tuning, or to operate a muting circuit which quiets the receiver when a low level signal (or no signal) is being received that would result in a noisy audible output. If such circuit is not present in a given FM receiver, design of a circuit that produces a level corresponding to the full range of amplitude fluctuations associated with the fading phenomena is within purview of the skilled artisan. The meter drive circuit is the preferred choice, however, because its output reflects amplitude changes over a very wide range of input signal levels. The muting signal, because it is typically derived at a point following the limiting action normal in FM receivers, produces useable amplitude fluctuations only when the signal has dropped below limit level, i.e. only weak signal fluctuations are sensed.

Many existing FM receivers employ a single integrated circuit which contains IF amplifiers, detectors, and audio amplifiers, an example of such integrated circuit being LM3089 marketed by National Semiconductor Corporation, Santa Clara, Calif. Such integrated circuit has an output terminal on which appears a voltage reflecting change in amplitude of signal voltage applied to the circuit input; in stationary receivers a tuning meter is typically connected to the terminal so as to facilitate accurate tuning of the receiver by peaking the meter. Mobile receivers employing the integrated circuit, however, typically do not include a tuning meter and the output of the integrated circuit can be employed in practicing the invention to provide a signal voltage that has a magnitude representative of the received signal amplitude. This signal appears on circuit path 38.

Figure 2:
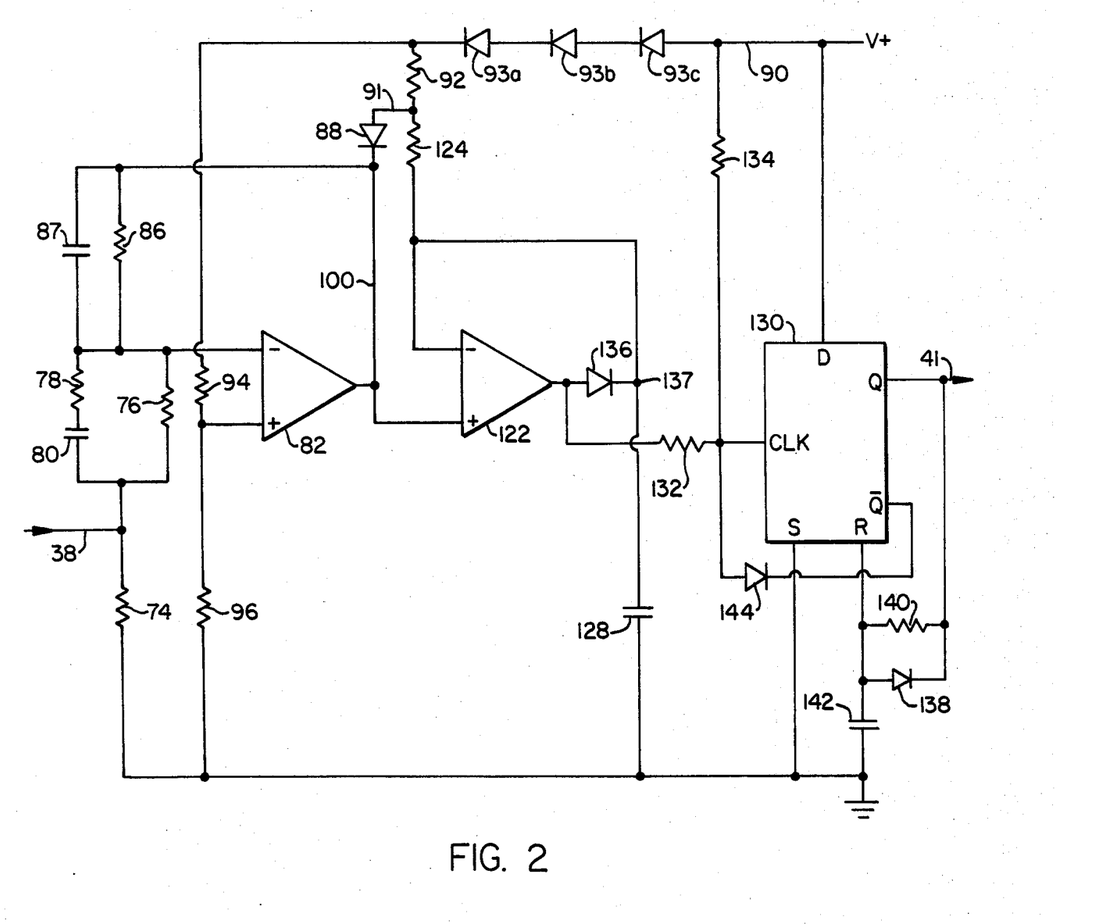
FIG. 2 is a schematic of a circuit for analyzing and comparing the received signal and producing a switching signal if the received amplitude is below a reference threshold.

Decision and control circuit 40 is shown in greater detail in FIG. 2 and receives an input at a terminal to which circuit path 38 is coupled. The signal applied to decision and control circuit 40 appears across an input resistor 74. The input is coupled through a network composed of a series resistor 76 which is shunted by a series combination of a resistor 78 and a capacitor 80. As will be explained more fully hereinbelow, the network formed by resistors 76 and 78 and capacitor 80 causes the gain afforded by an op-amp 82 to vary with the frequency so that for slow changing signal variations the gain is relatively low and for fast changing signal variations the gain is relatively high. The network also includes a series resistor 86, shunted by a lead capacitor 87, and a forward biased diode 88 which are coupled to the power supply on a bus 90 through a conductor 91, a resistor 92 and a diode chain formed by diodes 93a, 93b and 93c. In one system designed in accordance with the invention the network is such that op-amp 82 has a gain of about 1.5 for DC level and low frequency signal components and a gain of about 4 for high frequency signal components. The input signal is coupled to the inverting input (−) of the op-amp 82 in consequence of which the output of the op-amp will be inverted with respect to the input. The non-inverting input (+) of the op-amp is coupled to a voltage divider formed by resistors 94 and 96.

The output of op-amp 82 thus varies with reference to the voltage appearing at the inverting input of the op-amp; excursions in the output voltage are of a polarity opposite from those applied at the input of the op-amp because the input is applied to the inverting input. For example, an excursion in the signal applied to the input in the range of about 0.2 volts to about 5.2 volts would appear at the output as an excursion of about 12 volts to about 4–5 volts. This input range to op-amp 82 accords with the typical range of signal excursions appearing on circuit path 38 whereas the output range accords with the succeeding circuit elements in decision and control circuit 40.

The output of op-amp 82 appears on a circuit path 100 which is connected to the junction between the cathode of diode 88 and resistor 86 so that the cathode of the diode is at the same level as the output of op-amp 82. The anode of the diode is at a voltage greater than the cathode voltage by an amount equal to the forward voltage drop across the diode, about 0.6 volts for a silicon diode. Circuit path 100 is connected to the non-inverting input of an op-amp 122. The inverting input of the latter op-amp is coupled to a timing circuit formed by a resistor 124 and a capacitor 128; the timing circuit extends between the power supply and ground. The inverting input of op-amp 122 is connected to the terminal of resistor 124 remote from the power supply connection.

The output of op-amp 122 is connected to the clock input of a data-type flip-flop 130 through a resistor 132. The clock input of flip-flop 130 is also connected to power bus 90 via a resistor 134. There is a diode 136 having its anode connected to the output of op-amp 122 and its cathode connected to a junction point 137 between resistor 124 and capacitor 128. The voltage appearing on junction 137 is referred to in the following description as a reference threshold voltage with which the received signal on the connected antenna translated to a voltage on circuit path 100 is compared. The voltage on circuit path 100 is referred to as a control signal. It will be explained later that op-amp 122 functions both as a comparator and as a peak detector.

The data input to flip-flop 130 is coupled to power supply bus 90 and the set input to the flip-flop is connected to ground. The Q output of the flip-flop constitutes the output of decision and control circuit 40 and is coupled to the reset input of the flip-flop through a parallel combination composed of a diode 138 and a resistor 140. A capacitor 142 is connected between the reset input and ground. The $\overline{Q}$ output is fed back to the clock input through a diode 144.

As will be described more fully hereinafter, the output of decision and control circuit 40 is a pulse on the Q output of flip-flop 130. Such pulse toggles RF switch 28 in response to deterioration of the input signal to the antenna connected to receiver 12. The duration of the pulse is set by the time constant of resistor 140 and capacitor 142 and as will later be explained sets a minimum "sampling interval" for the circuit.

Figure 3:
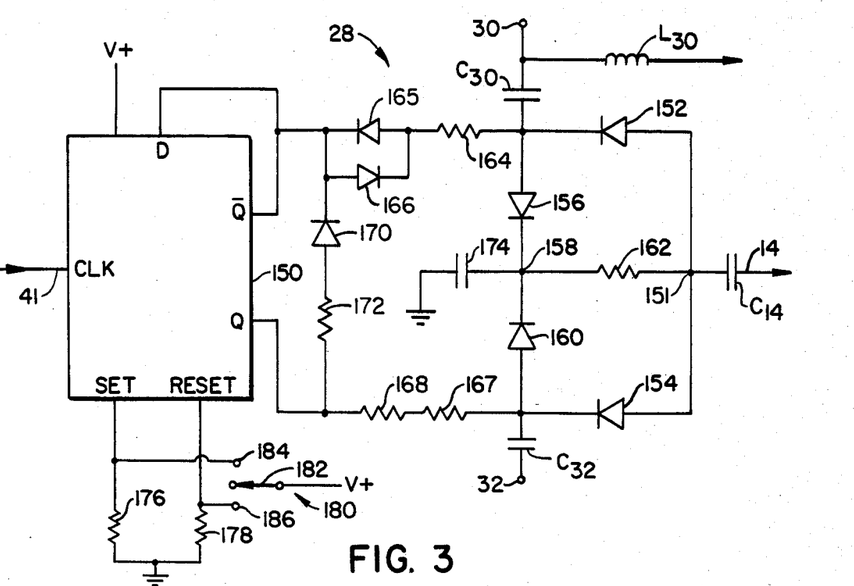
FIG. 3 is schematic diagram of a switching circuit for rapidly switching between two antennas.

A suitable form of RF switch 28 is shown in FIG. 3. The input of the circuit is constituted by the clock terminal of a data type flip-flop 150 to which signal path 41 is connected. Flip-flop 150 has a Q output and a $\overline{Q}$ output and is arranged so that the state of the signals on the outputs is switched on the leading edge of a positive going pulse applied on circuit path 41. That is to say, during one state the Q output is at a voltage higher than $\overline{Q}$ output, and in the other state the $\overline{Q}$ output is at a voltage higher than the Q output. A network composed of four PIN diodes is coupled between the Q and $\overline{Q}$ outputs to effect antenna switching. Capacitors $C_{30}$ and $C_{32}$ couple the respective antennas to the network and a capacitor $C_{14}$ couples the RF output of the switching circuit at a switch output junction 151 to output circuit path 14.

There is a PIN diode 152 which extends between antenna 30 and output junction 151 so that when the diode is forward biased, an RF signal path is established between the antenna and the output junction. An equivalent PIN diode 154 extends between antenna 32 and output junction 151 so that when the latter diode is forward biased, an RF path is established between the latter antenna and the switch output. There is a control PIN diode 156 which extends from the $\overline{Q}$ output to a junction point 158 which is at RF ground. A similar control PIN diode 160 extends from the Q output to junction point 158. Connected between junction point 158 and output junction 151 is a dropping resistor 162. The junction point of diodes 152 and 156 is connected to the Q output of flip-flop 150 through a resistor 164 and paralleled diodes 165 and 166. The junction point of diodes 154 and 160 is connected to the Q output of the flip-flop through a resistor 167 and a resistor 168. The resistance values of resistors 162, 167 and 164 ae alike and are high compared with the r-f circuit impedance. They therefore provide a path for the switching current flow from Q to $\overline{Q}$ and vice versa without significantly loading the r-f circuitry. As can be seen in the drawing, the terminal of dropping resistor 162 remote from circuit point 158 is connected to the respective anodes of PIN diodes 152 and 154.

When the $\overline{Q}$ output is high with respect to the Q output, a current path is established from the $\overline{Q}$ output to the Q output through diode 166, resistor 164, diodes 156, resistor 162, diode 154, resistor 167, and resistor 168. Diodes 154 and 156 are forward-biased to present r-f signal paths of very low resistance. Thus the signal from antenna 32 is connected to the output circuit 14 through a path providing low switch insertion loss while any signal from antenna 30 is substantially shorted to r-f ground at junction 158 through a low resistance path providing high switching isolation. Diodes 160 and 152 are reverse biased in this switching condition and act essentially as open circuits.

When flip-flop 150 is switched to the opposite state, a current path is established from the Q output to the $\overline{Q}$ output through resistor 168, resistor 167, diode 160, resistor 162, diode 152, resistor 164, and diode 165. The current flow direction through resistors 164 and 167 is reversed as is diode biasing. Thus antenna 30 is now connected to the output through diode 152, while signals from antenna 32 are substantially shorted to r-f ground a junction 158 through diode 160. Diodes 156 and 154 now act as open circuits.

It is the voltage differential between the Q and $\overline{Q}$ outputs of flip-flop 150 that is applied to the resistor/diode matrix. The polarity of the differential changes with switching but the value is substantially constant. The resistor value/diode type selections are such that the switching voltage value established at the switch output 151 does not change except for a momentary transient during the very brief switching interval. The balanced nature of the switch serves substantially to obviate switching signal interference.

For providing an indication of circuit condition to the user of the device an LED 170 is connected between the Q and the $\overline{Q}$ outputs through a current limiting resistor 172. The LED is preferably a tri-color LED which displays a first color when Q output is high with respect to the $\overline{Q}$ output, a second color when the $\overline{Q}$ output is high with respect to the Q output, and a third color when flip-flop 150 rapidly switches between the two states.

Oppositely polarized diodes 165 and 166 function as described above when the circuit is active. The diodes are preferably Schottky diodes so that they function as capacitors when power to flip-flop 150 is interrupted. The power is interrupted when the receiver in which apparatus of the invention is incorporated is switched to AM operation; during AM operation the Schottky diodes effectively disconnect the circuit of FIG. 3 from the AM antenna and thus avoid undue loading of the antenna. The AM section of the receiver is coupled to antenna 30 through an inductance $L_{30}$ which affords a high impedance to signals in the VHF FM band and a low impedance to signals in the AM broadcast band. The current through resistor 168 in series with the Q output of flip-flop 150 produces a voltage drop compensating for that across Schottky diodes 165 or 166 placed in series with the $\overline{Q}$ output. A capacitor 174 is connected between circuit point 158 and ground. This establishes circuit point 158 at RF ground but isolates the circuit point from DC ground.

The set and reset terminals of flip-flop 150 are normally connected to ground through resistors 176 and 178 respectively. A switch 180 can be provided to permit the user of the system to switch the system to one or the other of the antennas. The switch has a moving contact 182 which is connected to the system power supply. The switch is a three position switch with a center position at which the moving contact is not connected. There is a fixed contact 184 connected to the set terminal and a fixed contact 186 connected to the reset terminal. When the operator operates the switch so that moving contact 182 is in contact with fixed contact 184, the Q output is high with respect to the $\overline{Q}$ output and antenna 30 is coupled to the output. When moving contact 182 is connected to fixed contact 186, the $\overline{Q}$ output is high with respect to the Q output and antenna 32 is coupled to the output. In the center (off) position, the circuit responds to switching commands from decision and control circuit 40.

The operation of the embodiment of the invention shown in FIGS. 1–3 will be described in connection with the signal diagrams of FIGS. 4–8. In the ensuing description it will be assumed that the signal appearing on the circuit path 38 is derived from a meter drive terminal in a receiver equipped with an integrated circuit having such meter drive terminal and varies at a rate proportional to amplitude variations of the signal received at the antenna that is connected to the receiver by RF switch 28. Reference will be made to signal conditions at various points within decision and control circuit 40 in FIG. 2. Because amplifier 82 at the input of the decision and control circuit is an inverting amplifier, a positive going signal representative of an increase in signal strength applied to the input causes negative going signals at the output of op-amp 82 and the other points within the decision and control circuit. Thus the direction of change of signal level in the curves of FIGS. 4–8 is opposite from the direction of change of received signal strength on antenna 30 or 32.

Figure 4:
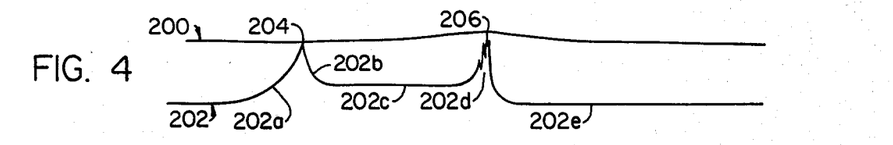
FIGS. 4 through 8 are plots of signal amplitude versus time for various points in the circuit of FIG. 2 for various signal conditions received by the antennas.

Referring to FIG. 4, there is a curve 200 which represents the voltage at circuit point 137. Such voltage constitutes a reference threshold voltage with which the decision and control circuit compares a sensed signal voltage having a magnitude representative of the received signal on the antenna that is connected by switch 28 to receiver 12 after amplification and inversion by op-amp 82, such signal voltage being represented in FIG. 4 by curve 202. Curve 202 indicates the absolute value of the output of op-amp 82 appearing on circuit path 100; i.e. the control signal.

At the left hand side of FIG. 4 curve 202 has a substantially flat portion which indicates that the signal received by the antenna connected to the receiver by switch 28 is stable and of adequate strength. Curve 200 is correspondingly flat. The reason for this relationship between curves 200 and 202 can be appreciated by reference to FIG. 2. Op-amp 122, the output of which is coupled to circuit point 137, produces an output only when there is a substantive change in the strength of the signal received by the connected antenna. The signal received at the antenna, represented by curve 202, is substantially constant in the situation depicted at the left hand side of FIG. 4. In this condition the voltage at circuit point 137 is substantially equal to the voltage at conductor 91 because capacitor 128 charges to that voltage through resistor 124. Moreover, the voltage on conductor 91 bears a fixed relation to the voltage on circuit path 100 because of the presence of forward biased diode 88. Thus when the signal received by the connected antenna is substantially constant, the voltage at circuit point 137 (curve 200 of FIG. 4) bears a substantially constant relationship with the control signal voltage on circuit path 100 (curve 202 of FIG. 4), differing from the latter voltage by an amount equal to the diode conduction drop.

Switching action is triggered when the voltage at the non-inverting input of op-amp 122 becomes more positive than the voltage (the threshold level) applied to the inverting input. Normally the reverse is the case and the output of op-amp 122 is held low and disconnected from point 137 by the now reverse-biased diode 136. The voltage at the clock input of flip-flop 130 is below trigger level (nominally $\frac{1}{2}$ of V+). That voltage is controlled by the selection of resistors 132 and 134. When the signal applied to the non-inverting input of op-amp 122 rises above the threshold level at the inverting input, the output of op-amp 122 increases very rapidly as the result of comparator action. This increase is transferred to the clock input of flip-flop 130 and because of proper selection of resistance values of resistor 132 and 134, switching takes place. If the signal from the alternate antenna is clean, the voltage at the non-inverting input of op-amp 122 immediately drops below the threshold level and the output voltage of op-amp 122 returns to a low state.

If the signal from the alternate antenna is also perturbed, the resultant voltage at the non-inverting input of op-amp 122 following switching can remain above the threshold value. The rise in the output voltage of op-amp 122 that caused the switching continues until diode 136 becomes forward biased and a charging current is delivered into capacitor 128. The capacitor voltage (the threshold voltage at point 137) increases until it equals the voltage at the non-inverting input of op-amp 122. Thus, op-amp 122 functions as a peak detector that increases the threshold level to the peak value of the disturbed control signal voltage on circuit path 100. A minimum sampling period for this level adjustment is set in accordance with the time constant of resistor 140 and capacitor 142 associated with flip-flop 130.

The portion of curve 202 indicated at 202a represents a condition in which the signal received by the connected antenna experiences a fast fade, i.e., a rapid decrease in strength which occurs within a fraction of carrier wavelength and can arise from movement into a fade zone by the vehicle on which the apparatus of the invention is installed. The rapid decrease in signal strength continues until the signal representative of received signal strength equals the reference threshold represented by curve 200. Such equality is depicted at 204 in FIG. 4. Curve portion 202b represents the transient condition during switching and typically had a duration of 5 microseconds more or less, a period which is not perceivable by the listener. Curve portion 202c depicts a condition after switching when the other antenna is coupled to the receiver and delivering a satisfactory signal. It will be noted that the level of the signal depicted by curve portion 202c is greater than that depicted at the left hand side of FIG. 4, indicating that the signal from the now connected antenna is less than that from the previous antenna. It is emphasized again that the switching between antennas as described in connection with FIG. 4 takes place quickly enough to minimize perceivable disruption in the receiver.

In effecting the antenna switching in response to a fast fade as described immediately above, the control signal voltage on circuit path 100 (FIG. 2) follows the received signal strength as represented by curve portion 202a. The control signal voltage at circuit path 100 is coupled to the positive input of op-amp 122. The inverting input of op-amp 122 is at a level corresponding to that of conductor 91 before onset of the fast fade. The fast fade results in an increase in the control signal voltage on circuit path 100 which is substantially immediately reflected at the non-inverting input of op-amp 122. The voltage at the inverting input, however, cannot respond immediately because of the presence of the relatively large capacitance (e.g., 0.1 $\mu$f) of capacitor 128. Consequently op-amp 122 produces a rising output in response to which flip-flop 130 triggers to effect antenna switching.

Curve portion 202d indicates the response of the circuit to selective fading, fading which is typically more severe for relatively high modulating frequencies in the received signal. The system does not respond to relatively small fluctuations that do not substantially interfere with program material but when the fluctuations increase to or above the reference level established by curve 200, such as at 206, switching occurs and the other antenna is then connected to the receiver as described above. Curve portion 202e represents the connected antenna signal after such switching occurs.

Figure 5:
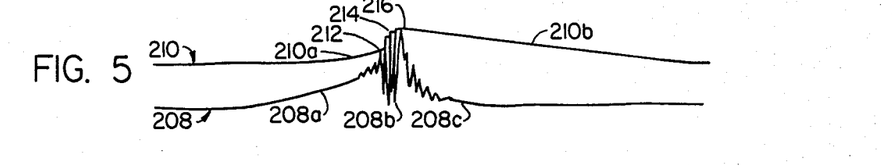

Further insight into the operation of decision and control circuit 40 can be had by reference to FIG. 5 which illustrates system operation in the case where both antennas momentarily receive an unsatisfactory signal. At the left hand side of FIG. 5, curve portion 208 represents a control signal signal produced by the connected antenna and curve portion 210 represents the reference threshold voltage signal. Because the received signal is substantially below the reference threshold level, reception is considered satisfactory and no antenna switching occurs. Curve portion 208a represents a fade in signal strength picked up by the connected antenna. Because the fade starts out as a slow fade, the reference threshold voltage signal, indicated at curve portion 210a, follows the fade in the signal received by the connected antenna. The reference threshold level appears at circuit point 137 and can track slow changes, because the amount of change of the received signal during a period equivalent to the time constant formed by resistor 124 and capacitor 128 is insignificant. Ultimately, however, the rate of change of the signal received by the connected antenna is such that the received signal falls to a level at which the control signal level on circuit path 100 rises above the threshold voltage as at 212 in FIG. 5. This turns on op-amp 122 which in turn triggers flip-flop 130 to effect antenna switching. In the case depicted in FIG. 5, the signal received by the newly connected antenna is worse than the signal from the previously connected antenna.

The decision and control circuit is arranged so that the circuit is not immediately switched back to the originally connected antenna. This mode of operation arises by the effect of resistor 140, capacitor 142, and diodes 138 and 144. The $\overline{Q}$ output of flip-flop 130 is normally in a high state so as to reverse bias diode 144. The Q output of flip-flop 130 is normally in a low state so that capacitor 142 stores no charge, any charge having been discharged to Q output of the flip-flop through resistor 140 and/or diode 138. Upon application of a pulse from op-amp 122 to the clock input of flip-flop 130 the above states are reversed, and the $\overline{Q}$ output is low and the Q output is high. A low state at the $\overline{Q}$ output forward biases diode 144, which returns to and retains at a low value the voltage at the clock input and prevents further triggering during the sampling interval. When the Q output of flip-flop 130 goes high, a current is caused to flow through resistor 140 to charge capacitor 142. After a time determined by the values of resistor 140 and capacitor 142, the voltage at the junction point between those two elements, which is connected to the reset input of flip-flop 136, rises so as to reset the flip-flop. When the flip-flop is reset to its normal state, the Q output goes to a low state and the $\overline{Q}$ output goes to a high state. The clock input signal is no longer clamped by diode 144 and triggering can again occur. In one circuit designed in accordance with the invention resistor 140 has a value of one meg$\Omega$ and capacitor 142 has a value of 47 pf. With such elements the triggering pulse applied by the Q output to circuit path 41 has a duration of about 50 microseconds. Accordingly, in the condition depicted in FIG. 5, the second antenna, even though its signal is unsatisfactory, remains attached to the receiver for about 50 microseconds.

In the situation shown in FIG. 5, the decision and control circuit 40 switches back to the original antenna after expiration of 50 microseconds. Although the curves of FIG. 5 are not drawn to precise scale in the time domain for the purposes of clarity, the antenna is not switched at point 214 because the pulse produced by flip-flop 130 has not timed out. Rather, the system does not switch back to the originally connected antenna until the crossover indicated at 216. At that point the signal on the originally connected antenna, although noisy, is such that the control signal level on circuit path 100 is below the reference threshold level indicated at 210b. Thus further switching does not occur and the antenna receiving the better signal remains connected to the receiver. Although the condition depicted in FIG. 5 would probably be perceived by the listener, the duration of signal disruption is short and, as soon as the signal from one of the antennas is of satisfactory level, switching terminates.

Figure 6:
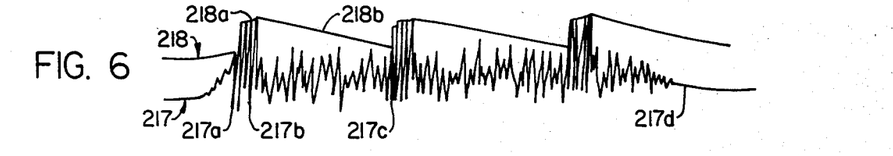

FIG. 6 further illustrates operation of the decision and control circuit by which it favors reception of the better of the disturbed signals. Curve 217 represents the control signal received by the connected signals as it is developed on circuit path 100 and curve 218 represents the threshold level at circuit point 137. At curve portion 217a disturbance in the received signal exceeds the threshold level and switching takes place. But the signal from the alternate antenna is even more disturbed and is applied to the non-inverting input of op-amp 122 during the short (e.g. 50 microseconds) sampling interval (to curve portion 217b). The threshold level is correspondingly raised by the peak level detection action of op-amp 122 as evident at curve portion 218a. At the end of the sampling interval the original antenna is reconnected and its signal, though disturbed, is accepted because the threshold setting has been raised and the circuit is more tolerant. The threshold level slowly drops (curve portion 218b) as the charge on capacitor 128 drains off through resistor 124. The resistor/capacitor time constant is long (e.g., 0.1 seconds) but the threshold level will eventually reach equality with the present signal, as at curve portion 217c, whereupon the cycle repeats. Because the threshold level is quickly raised by the op-amp action and slowly decreased by discharge of capacitor 128 through resistor 124, the circuit causes the receiver to dwell predominately on the better signal, by a ratio measured in thousands if the disturbance levels in the signals from the alternate antennas are substantially different. At point 217d, one signal has cleared and the system stabilizes.

Figure 7:
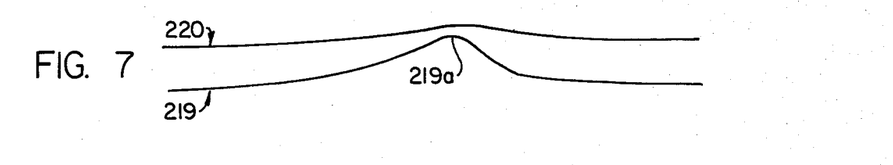

FIG. 7 further illustrates the influence of slowly fading signals received by the connected antenna on the level of the reference threshold voltage at circuit point 137. Slow fades typically do not cause program disturbance. Curve 219 represents the signal level received by the connected antenna as reflected by the control signal voltage level on circuit path 100 and curve 220 represents the reference threshold at circuit point 137. It will be noted that the received signal slowly decreases in value, a phenomenon manifested in FIG. 7 by a slow increase of the voltage level at circuit path 100 as shown by curve 219. Increase of the control signal voltage level at circuit path 100 is in turn manifested on conductor 91. The rate of change of the received signal strength is sufficiently slow that the voltage at circuit point 137 and at the inverting input of op-amp 122 experiences an increase because there is sufficient time to charge capacitor 128 through resistor 124. Accordingly, although the signal fades slowly and the sensed voltage reaches a maximum value at curve portion 219a, it never crosses the threshold voltage, never effects a change of state in the output of op-amp 122, and therefore never triggers a flip-flop 136.

Figure 8:
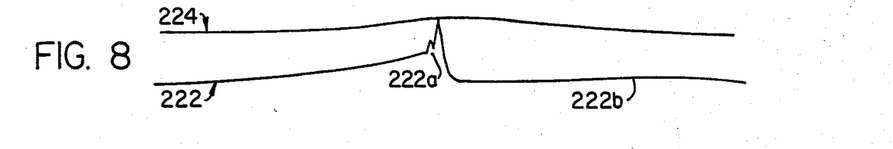

In many cases, a slow fade in the strength of the signal received by the connected antenna is eventually accompanied by selective fading wherein high frequency components of the modulated signal are disturbed to a greater degree than are lower frequency components of the modulated signal. In FIG. 8, curve 222 represents the received signal strength at the connected antenna and curve 224 represents the reference threshold level as represented at circuit point 137. The left hand portion of FIG. 8 is substantially identical to the left hand portion of FIG. 7 and both represent a received signal that fades at a rate sufficiently slow that the reference threshold voltage experiences a similar change so that antenna switching does not occur. In the condition depicted in FIG. 8, however, selective fading, indicated at curve portion 222a, occurs at a rapid rate which circuit point 137 cannot follow due to the time constant established by resistor 124 and capacitor 128. Thus the signal applied to the inverting input of op-amp 122 is sufficiently different from the control signal applied to the non-inverting input of that op-amp that the op-amp output switches and triggers flip-flop 130. This operates antenna switch 28 so that the other antenna is connected to the receiver. As indicated by curve 222b, it is assumed that the signal on the now connected antenna is stable and of a satisfactory level.

Decision and control circuit 40, in addition to effecting antenna switching at appropriate times in a rapid manner so as to minimize disruption to the listener, affords other subsidiary functions. For example, the forward conduction drop of diode 88 (about 0.6 volts for a silicon diode) remains relatively constant over wide excursions in the output voltage of op-amp 82 appearing on circuit path 100. This diode voltage constitutes an incremental addition to the threshold level established at circuit point 137 so that the circuit automatically resets level for the widely different signal strengths received as the receiver is tuned among stations, or as the receiver moves toward or away from a given transmitter. Further, when very weak signals are received, the control voltage on circuit path 100 increases and approaches the level at the junction of resistor 92 and diode 93a (as established by the voltage divider formed by diodes 93a, 93b and 93c and resistor 94 and 96). There is then reduced conduction through diode 88, the incremental threshold difference gradually disappears and noise causes repetitive switching so that the system automatically searches for the first antenna to provide a signal. Resistors 94 and 96 are chosen such that this condition ensues for a selected minimum input signal on line 38.

In order to afford a more complete description of the preferred embodiment of the invention as shown in FIGS. 2 and 3, there is set forth hereinbelow a table of values of the various components used in one specific circuit in accordance with those figures. The listed values are exemplary only and are not intended to limit the invention in any way.

| DECISION AND CONTROL CIRCUIT 40 (FIG. 2) | | |
| --- | --- | --- |
| Resistor | 74 | 33 kΩ |
| " | 76 | 470 kΩ |
| " | 78 | 220 kΩ |
| " | 86 | 680 kΩ |
| " | 92 | 3.90 kΩ |
| " | 94 | 6.20 kΩ |
| " | 96 | 4.7 kΩ |
| " | 124 | 1 MΩ |
| " | 126 | 39 kΩ |
| " | 132 | 82 kΩ |
| " | 140 | 1 MΩ |
| Capacitor | 80 | 12 pf |

| -continued | | |
| --- | --- | --- |
| DECISION AND CONTROL CIRCUIT 40 (FIG. 2) | | |
| " | 98 | 5 pf |
| " | 128 | 0.1 μf |
| " | 142 | 47 pf |
| Diodes | 88, 93, 95, 97, 134, 138, 144 | IN914 |
| Op-amps | 82, 122 | LF353N |
| D Flip-Flop | 136 | ½ 4013B |

| RF SWITCH 28 (FIG. 3) | | |
| --- | --- | --- |
| Resistor | 162, 188, 190 | 2.2 kΩ |
| " | 166 | 2.7 kΩ |
| " | 172 | 180Ω |
| " | 176 | 10 kΩ |
| " | 178 | 10 kΩ |
| Capacitor | 174 | 0.1 μf |
| " | $C_{30}, C_{32}, C_{14}$ | 0.01 μf |
| PIN Diodes | 152, 154 | MPI 3401 |
| " | 156, 160 | MPI 3401 |
| Diodes | 168, 170 | 5082-2835 (Schottky) |
| " | 164 | XC-5491 |
| Inductor | $L_{30}$ | 5μhenries |
| D Flip-Flop | 150 | ½ 4013B |

Although one embodiment of the invention has been shown and described, it will be obvious that other adaptations and modifications can be made without departing from the true spirit and scope of the invention.

What is claimed is:

1. In a method for switching between a plurality of antennas to select an antenna that has a satisfactory FM signal thereon, the steps of sensing the received FM signal before demodulation and while the received signal has amplitude fluctuations representative of multipath phenomena to obtain a control signal in which said amplitude flucations are manifested, comparing the control signal with a reference threshold signal, switching to another antenna when a control signal amplitude excursion passes through the reference threshold signal level, inhibiting further switching back to another antenna for a period corresponding to the period of a frequency above an audible frequency, and if interference in the received FM signal during the period that further switching is inhibited is greater than in the received FM signal before switching, as manifested in the control signal, then momentarily resetting the level of the reference threshold signal to a value related to the peak amplitude of the control signal within said period that further switching is inhibited.

2. In a method for switching between a plurality of antennas to select an antenna that has a satisfactory FM signal thereon, the steps of sensing the received FM signal before demodulation and while the received signal has amplitude fluctuations representative of multipath phenomena to obtain a control signal in which said amplitude fluctuations are manifested, comparing the control signal with a reference threshold, switching to another antenna when a control signal amplitude excursion passes through the reference threshold signal level, inhibiting further switching back to another antenna for a period corresponding to the period of a frequency above an audible frequency, and momentarily resetting the level of the reference threshold signal to a level related to the control signal peak amplitude in association with said antenna switching step.

3. In a method as defined in claim 1 or 2 wherein switching back to another antenna is inhibited for a period on the order of 50 microseconds.

4. In a method for switching between a plurality of antennas to select an antenna that has a satisfactory signal thereon, the steps of
sensing the received signal while the received signal has amplitude fluctuations representative of multipath phenomena to obtain a control signal in which said amplitude fluctuations are manifested,
comparing the control signal with a reference threshold signal,
switching to another antenna when a control signal amplitude excursion passes through the reference threshold signal level, and
when the control signal level exceeds the reference threshold signal level, momentarily resetting the level of the reference threshold signal to a value substantially equal to the peak value of the control signal excursion.

5. In a method as defined in claim 4 wherein the reference threshold signal is momentarily reset when the control signal level exceeds the reference threshold signal level immediately after switching to another antenna.

6. In a diversity receiver system having at least two antennas,
antenna switching means for switching the receiver system from one antenna to the other,
sensing means for producing a control signal related to the amplitude of the received signal, multipath disturbances in the received signal being manifested in said control signal,
means which are substantially non-responsive to relatively fast changes in the control signal, including those changes produced by multipath disturbances in the received signal, for setting a reference threshold voltage,
means for comparing the control signal with the reference threshold voltage,
means responsive to the output from said comparing means for activating said switching means, and
means responsive to the control signal and reference threshold voltage for rapidly resetting the reference threshold voltage to a level related to the control signal, the reset reference threshold voltage remaining only momentarily at said reset level and then decaying slowly toward the level provided by said means for setting a reference threshold voltage following operation of said resetting means.

7. In a diversity receiver as defined in claim 6 wherein said means for setting a reference threshold voltage includes a capacitor across which said reference threshold voltage is developed, and
said means for rapidly resetting the reference threshold voltage includes a diode for establishing the control signal across the capacitor by rapid charging of the capacitor through the diode.

8. In a diversity receiver as defined in claim 7 wherein said means for setting a reference threshold voltage provides a discharge path for said capacitor for return of a reset reference threshold voltage to the level provided by said setting means.

9. In a diversity receiver as defined in claim 6 wherein said means for rapidly resetting the reference threshold voltage comprises peak detector means having an output when the level of the control signal exceeds the reference threshold voltage level, said peak detector means operates after operation of said switching means when the control signal level immediately following operation of the switching means exceeds the reference threshold voltage level, the reference threshold voltage being substantially unaltered by said peak detector means when the control signal level immediately after operation of the switching means does not exceed the reference threshold voltage level.

10. In a diversity receiver as defined in claim 9 including
means for inhibiting operation of said switching means during operation of said resetting means.

11. In a diversity receiver as defined in claim 6 including
means for inhibiting operation of said switching means during operation of said resetting means.

12. In a diversity receiver as defined in claim 6 including
means for inhibiting operation of said switching means for a period corresponding to the period of a frequency above an audio frequency immediately following operation of said switching means.

13. In a diversity receiver as defined in claim 6 wherein said reference threshold voltage setting means is responsive to relatively slow changes in said control signal so as to vary the reference threshold voltage at a relatively slow rate with relatively slow changes in said control signal.

14. In a diversity receiver as defined in claim 6 wherein
said reference threshold voltage setting means includes a capacitor, and
said means for rapidly resetting the reference threshold voltage includes peak detector means responsive to peak disturbance in said control signal for rapidly charging said capacitor to a level related to said peak disturbance.

15. In a diversity receiver as defined in claim 14 wherein said peak detector means includes a diode through which a charging current resets said reference threshold voltage established across said capacitor to the peak level of said control signal.

16. In a diversity receiver system having at least two antennas, antenna switching means for switching the receiver system from one antenna to the other, sensing means for producing a control signal related to the amplitude of the received signal, multipath disturbances in the received signal being manifested in said control signal, means for setting a reference threshold voltage, said reference threshold voltage setting means being substantially non-responsive to relatively fast changes in said control signal including those changes produced by multipath disturbances in the received signal, means for comparing the control signal with the reference threshold voltage, and means responsive to the output from said comparing means for activating said switching means, the improvement comprising
means responsive to the relative control signal and reference threshold voltages so as to momentarily reset the reference threshold voltage to a level derived from the control signal such that the antenna which provides the better received signal is predominately connected to the receiver system during periods of stimultaneous fades at the two antennas.

17. In a diversity receiver as defined in claim 16 wherein the reference threshold voltage is momentarily reset to a level substantially equal to the control signal by operation of said means for momentarily resetting the reference threshold voltage.

18. In a diversity receiver system as defined in claim 17 wherein the reference threshold voltage is momentarily reset to substantially the peak interference level of the control signal by operation of said means for momentarily resetting the reference threshold voltage.

19. In a diversity receiver system as defined in claim 16 wherein said reference threshold voltage setting means comprises a capacitor which is charged to the reference threshold voltage, said means for momentarily resetting the reference threshold voltage comprises peak detector means having an output connected to said capacitor for rapid charging of the capacitor to the peak interference level of the control signal.

20. In a diversity receiver as defined in claim 16 wherein said resetting means operates following operation of said switching means if the disturbance level in the received signal immediately after operation of said switching means exceeds that of the received signal which produced said switching operation.

21. In a diversity receiver system having at least two antennas, antenna switching means for switching the receiver system from one antenna to the other, sensing means for producing a control signal related to the amplitude of the received signal, multipath disturbances in the received signal being manifested in said control signal, means for setting a reference threshold voltage, said reference threshold voltage setting means being substantially non-responsive to relatively fast changes in said control signal including those changes produced by multipath disturbances in the received signal, means for comparing the control signal with the reference threshold voltage, and means responsive to the output from said comparing means for activating said switching means, the improvement comprising
means responsive to the reference threshold voltage and control signal for momentarily resetting the reference threshold voltage so as to reduce the difference between said reference threshold voltage and the control signal such that operation of the system in the selection of the antenna having the better received signal approximates that of a selection diversity system in that the better received signal is predominately connected to the receiver system during the time when disturbances are present in signals from both antennas, the reset reference threshold voltage decaying toward a level set by the reference threshold voltage setting means after each resetting thereof.

22. In a diversity receiver as defined in claim 21 wherein operation of said resetting means takes place following operation of said switching means whenever disturbance manifested in the control signal after switching antennas is greater than disturbance manifested in the control signal before antenna switching.

23. In a diversity receiver as defined in claim 21 wherein the reference threshold voltage is momentarily reset to the peak value of the control signal by said resetting means.

24. In a diversity receiver as defined in claim 21 wherein said means for momentarily resetting the reference threshold voltage comprises peak level detector means.

25. In a diversity receiver as defined in claim 24 wherein said reference threshold voltage setting means comprises a capacitor to which the output from said peak level detector means is connected.

26. In a diversity receiver as defined in claim 25 wherein said comparing means and peak level detector means include an operational amplifier which functions alternately as a comparator and peak level detector.

27. In a diversity receiver system having at least two antennas, antenna switching means for switching the receiver system from one antenna to the other, sensing means for producing a control signal related to the amplitude of the received signal, multipath disturbances in the received signal being manifested in said control signal, means for setting a reference threshold voltage, said reference threshold voltage setting means being substantially non-responsive to relatively fast changes in said control signal including those changes produced by multipath disturbances in the received signal, means for comparing the control signal with the reference threshold voltage, and means responsive to the output from said comparing means for activating said switching means, the improvement comprising
peak detection means responsive to the control signal and reference threshold voltages for momentarily resetting the reference threshold voltage to a value related to the control signal peak amplitude, said antenna switching and peak detection means being recurrently operated during periods that received signals from both antennas are disturbed as manifested in the control signal such that the time during which the receiver is connected to the antenna with the least disturbed signal greatly exceeds the time during which the receiver is connected to the antenna with the most disturbed signal.

28. In a diversity receiver having at least two antennas,
antenna switching means for switching the receiver system from one antenna to the other,
sensing means for producing a control signal related to the amplitude of the received signal, multipath disturbances in the received signal such as frequency selective fading being manifested in said control signal,
means for setting a reference threshold voltage, and
comparing/peak level detector means responsive to the control signal and the reference threshold voltage and having first and second outputs for activating said switching means and for momentarily resetting the reference threshold voltage to a level related to the control signal, respectively.

* * * * *

UNITED STATES PATENT AND TRADEMARK OFFICE
CERTIFICATE OF CORRECTION

PATENT NO. : 4,499,606

DATED : February 12, 1985

INVENTOR(S) : William R. Rambo

It is certified that error appears in the above-identified patent and that said Letters Patent is hereby corrected as shown below:

Column 7, line 33, "Q" should read --$\overline{Q}$--.

Column 13, in the DECISION AND CONTROL CIRCUIT 40 (Fig. 2) table beginning after line 55, reference numeral "126" should read --134--.

Column 14, in the DECISION AND CONTROL CIRCUIT 40 (Fig. 2) table continued after line 1, reference numeral "98" should read --87--; and "93, 95, 97, 134" should be changed to --93a, 93b, 93c, 136--.

Column 14, in the RF SWITCH 28 (Fig. 3) table beginning after line 10, "188, 190" should be changed to --164,168 --; reference numeral "166" should read --172--; reference numeral "172" should read --167--; reference numerals "168, 170" should be changed to --165, 166--; and reference numeral "164" should be changed to --170--.

Signed and Sealed this

Tenth Day of December 1985

[SEAL]

Attest:

DONALD J. QUIGG

Attesting Officer

Commissioner of Patents and Trademarks